(12) United States Patent
Kowalski et al.

(10) Patent No.: US 8,193,674 B2
(45) Date of Patent: Jun. 5, 2012

(54) ARRANGEMENT WITH GENERATOR BARS FOR A STATOR OF AN ELECTRICAL GENERATOR

(75) Inventors: Waldemar Kowalski, Mülheim an der Ruhr (DE); Christoph Lehmann, Neukirchen-Vluyn (DE); Claus-Georg Richter, Essen-Werden (DE); Karlheinz Spiess, Moers (DE)

(73) Assignee: Siemens Aktiengesellschaft, Munich (DE)

( * ) Notice: Subject to any disclaimer, the term of this patent is extended or adjusted under 35 U.S.C. 154(b) by 593 days.

(21) Appl. No.: 12/085,394

(22) PCT Filed: Nov. 23, 2006

(86) PCT No.: PCT/EP2006/068848
§ 371 (c)(1),
(2), (4) Date: Aug. 21, 2009

(87) PCT Pub. No.: WO2007/060207
PCT Pub. Date: May 31, 2007

(65) Prior Publication Data
US 2009/0295252 A1    Dec. 3, 2009

(30) Foreign Application Priority Data
Nov. 24, 2005 (EP) ..................... 05025685

(51) Int. Cl.
*H02K 3/12* (2006.01)
*H02K 3/46* (2006.01)
*H01R 39/32* (2006.01)
(52) U.S. Cl. ......... 310/201; 310/234; 310/260; 310/270
(58) Field of Classification Search .................. 310/201, 310/234, 260, 270; 174/94 R; 439/781, 439/798
See application file for complete search history.

(56) References Cited

U.S. PATENT DOCUMENTS

| | | | |
|---|---|---|---|
| 2,407,935 A * | 9/1946 | Perfetti et al. ................ | 310/201 |
| 4,151,434 A * | 4/1979 | Zona et al. ................... | 310/71 |
| 4,385,254 A | 5/1983 | Vakser et al. | |
| 4,915,653 A * | 4/1990 | Mair ............................ | 439/781 |
| 5,789,840 A | 8/1998 | Gould et al. | |
| 6,208,058 B1 | 3/2001 | Taji et al. | |
| 6,979,236 B1 * | 12/2005 | Stanton ........................ | 439/783 |
| 2002/0047454 A1 | 4/2002 | Joho | |
| 2007/0024249 A1 * | 2/2007 | Dooley ......................... | 322/44 |

FOREIGN PATENT DOCUMENTS
WO   WO 0147089 A2   6/2001
* cited by examiner

*Primary Examiner* — Quyen Leung
*Assistant Examiner* — Jose Gonzalez Quinones

(57) ABSTRACT

An arrangement having at least two generator bars for a stator of an electrical generator which are electrically connected to one another via a respective bar end is characterized, according to the invention, by the fact that the respective bar ends, which are electrically connected to one another, of the at least two generator bars are braced with respect to one another by means of a tape.

9 Claims, 2 Drawing Sheets

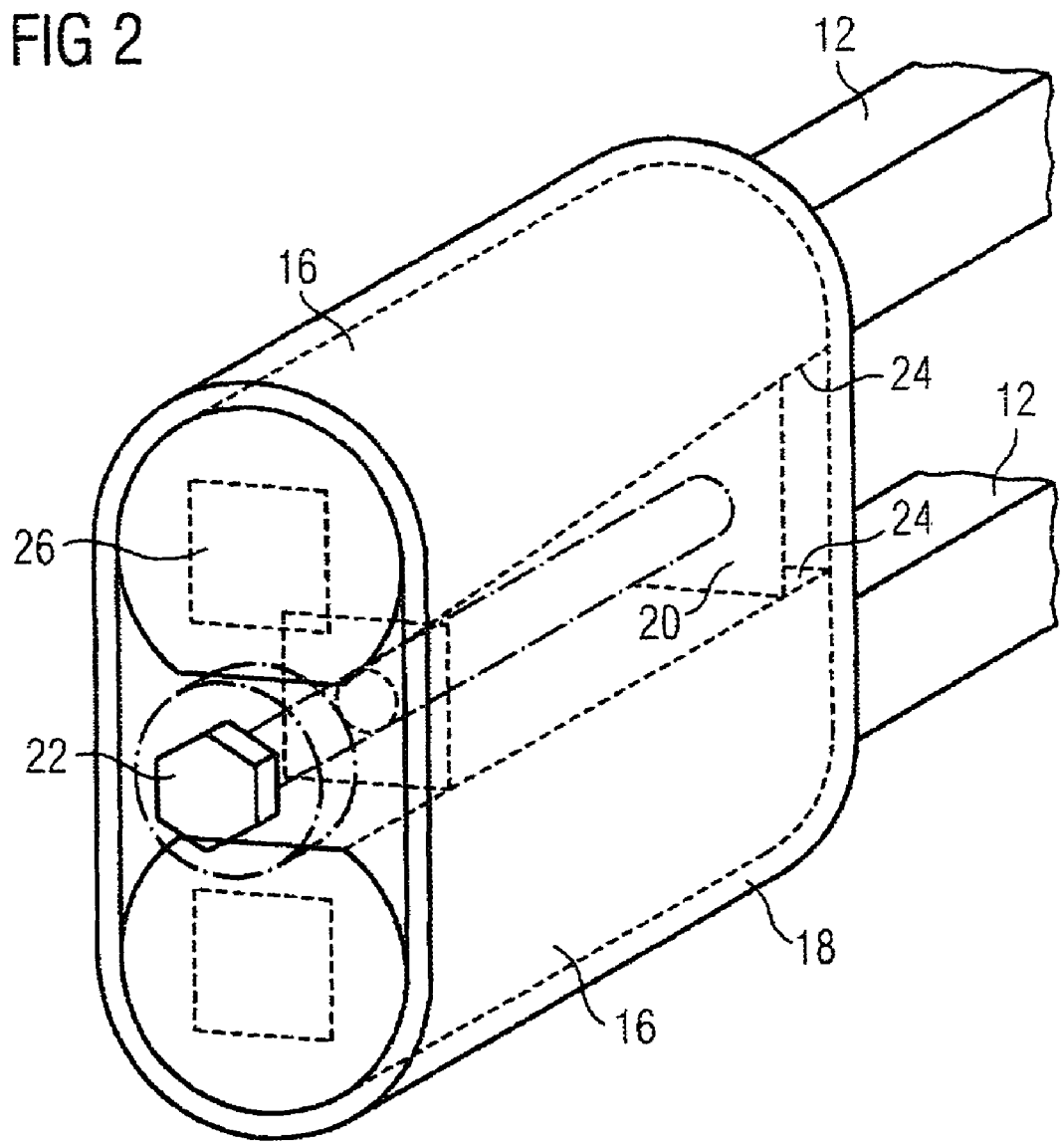

ARRANGEMENT WITH GENERATOR BARS FOR A STATOR OF AN ELECTRICAL GENERATOR

CROSS REFERENCE TO RELATED APPLICATIONS

This application is the US National Stage of International Application No. PCT/EP2006/068848, filed Nov. 23, 2006 and claims the benefit thereof. The International Application claims the benefits of European application No. 05025685.8 filed Nov. 24, 2005, both of the applications are incorporated by reference herein in their entirety.

FIELD OF INVENTION

The invention relates to an arrangement having at least two generator bars for a stator of an electrical generator, which are electrically connected to one another via a respective bar end. The invention also relates to a stator end winding having an arrangement such as this. Furthermore, the invention relates to an electrical generator having a stator end winding such as this.

BACKGROUND OF THE INVENTION

FIG. 1 schematically illustrates a stator end winding 10, as is known from the prior art, for an electrical generator. An electrical generator essentially comprises two parts, a stator as a stationary part, and a rotor arranged within the stator. A stator end winding 10 of the stator comprises a multiplicity of generator bars 12', which are electrically connected to one another. Each of the generator bars 12' in this case has respective bar ends 16', as well as an involute 14 running between them. The respective generator bars 12' have a multiplicity of conductor elements, which are twisted with one another.

During the production of a stator end winding 10 in the prior art, a multiplicity of generator bars 12' are inserted into corresponding slots in a laminated core of the stator. The bar ends 16' of in each two generator bars 12' are then mechanically aligned with one another with involutes turned in opposite directions. This means that the bar ends 16' are bent into suitable positions by means of appropriate tools. The bar ends 16' which have each been aligned with respect to one another are then mechanically connected. According to the prior art, this mechanical connection is produced, for example, by soldering or by screwing, by means of appropriate screw-connection elements.

U.S. Pat. No. 4,385,254 discloses an arrangement with at least two generator bars for a stator of an electrical generator.

SUMMARY OF INVENTION

One object on which the invention is based is to improve an electrical generator of the type mentioned initially by allowing the stator end winding to be produced in a less complex manner, and therefore at a lower cost.

According to the invention, this object is achieved by an arrangement of this generic type as claimed in the claims.

The object is also achieved by a stator end winding which is provided with an arrangement according to the invention such as this. Furthermore, the object is achieved by an electrical generator of this generic type which has a stator end winding according to the invention such as this.

The bracing according to the invention of the respective bar ends which are electrically connected to one another of the at least two generator bars by means of a strip avoids the need for complex manual alignment of the bar ends before making the electrical contact. According to the invention, the bar ends are accurately aligned with respect to one another by bracing by means of the strip. This measure considerably reduces the assembly effort and also avoids the risk of mechanical overloading of the bar ends by subsequent alignment.

The strip completely surrounds the mutually braced bar ends. This means that the strip is wound around the bar ends that are to be connected, from the outside. In consequence, the corresponding bar ends are braced with respect to one another by means of the strip.

The arrangement has a clamping element, which is arranged between the mutually braced bar ends, for bracing the bar ends in the strip. A clamping element such as this allows the bar ends to be aligned precisely with respect to one another during the bracing process. In this case, the clamping element advantageously forces the two bar ends apart from one another against the influence of the strip which surrounds them, and therefore aligns the bar ends with respect to one another, in a suitable manner.

In one advantageous embodiment, the clamping element is wedge-shaped and, in addition, the arrangement in particular has a clamping screw by means of which the clamping element can be moved with respect to the bar ends in order to brace the bar ends in the strip. The wedge-shaped configuration of the clamping element allows the bar ends to be clamped into the strip in a simple manner, simply by moving the clamping element. The bar ends which have been braced with respect to one another in this way are in this state adequately aligned with respect to one another in order to make an electrical connection. The provision of a clamping screw for moving the clamping element with respect to the bar ends allows the process of assembling the bar ends to be carried out particularly easily and thus saving time, by bracing by means of the wedge-shaped clamping element.

Furthermore, it is expedient for the clamping element to be electrically conductive. In this case, the electrically conductive connection can be made between the respective generator bar ends by means of the clamping element itself.

In one advantageous embodiment, the bar ends which are braced with respect to one another are each cylindrical. This measure makes it easy to fit the strip to the bar ends, and also to brace the bar ends within the strip.

The bar ends which have been braced with respect to one another are advantageously formed with a cylindrical surface which is rounded at least in places, and in particular is circular at least in places. A bar end configuration such as this which is in the form of a circular cylinder at least in places makes it even easier to fit the strip and to brace the bar ends in it.

In one advantageous embodiment, the bar ends which are braced with respect to one another each have a flattened contact surface for making contact with a clamping element. This results in a particularly robust contact surface for the clamping element at the bar ends, thus further simplifying the assembly process for connection of the bar ends.

BRIEF DESCRIPTION OF THE DRAWINGS

One exemplary embodiment of an arrangement according to the invention having at least two generator bars for a stator of an electrical generator will be explained in more detail in the following text with reference to the attached, schematic drawings, in which:

FIG. 2 shows a perspective view of a connection of two generator bar ends according to one embodiment of the invention.

DETAILED DESCRIPTION OF INVENTION

Figure 1:
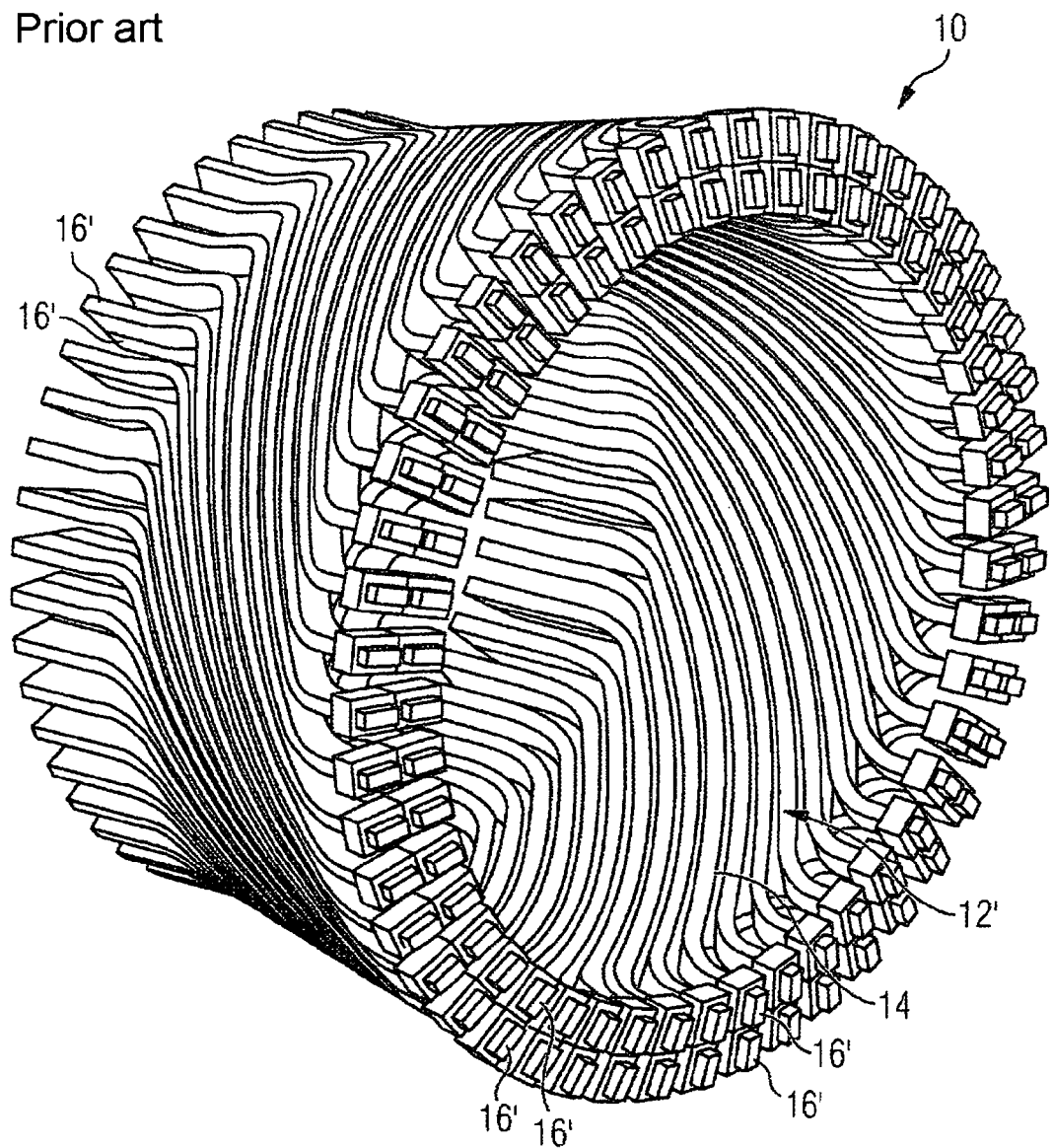
FIG. 1 shows a perspective view of a stator end winding, as known from the prior art, for an electrical generator.

FIG. 2 shows an embodiment according to the invention of a connection of two bar ends 16 of respective generator bars 12 of a stator end winding 10 of an electrical generator. Involutes 14 which are not illustrated in FIG. 2 but run in opposite directions, formed by the respective generator bars 12, are adjacent to the illustrated bar ends 16 of two generator bars 12. These involutes 14 are embedded in corresponding slots in a laminated core, which is likewise not illustrated, of the stator end winding 10. The two illustrated bar ends 16 project out of the laminated core, and are surrounded by a strip 18.

During assembly of the stator end winding 10, the annular strip is placed over the bar ends 16 and a wedge-shaped clamping element 20 is then moved parallel to the longitudinal axis of the bar ends 16, by means of a clamping screw 22. The movement of the clamping element 20 presses the bar ends 16 of the generator bars 12 apart from one another, and thereby clamps them into the strip 18. The bar ends 16 are therefore braced with respect to one another by means of the strip 18. The clamping element 20 is designed to be electrically conductive, and therefore makes an electrical connection between the two bar ends 16 of the generator bars 12.

The respective bar ends 16 of the two associated generator bars 12 each have a flattened contact surface 24 on mutually facing sides, for contact with the clamping element 20. The cylindrical bar ends 16 therefore have a circular end surface 26, which is flattened at one point. This results in a large contact area between the bar ends 16 and the clamping element, thus making it easier to force the bar ends 16 apart from one another while being braced within the strip 18.

The connection of the two bar ends 16 of the associated generator bars 12 according to the present embodiment according to the invention avoids the need for tedious alignment of the bar ends 16 during insertion of the generator bars 12 into the laminated core. This therefore avoids the risk of mechanical overloading of the bar ends 16 resulting from subsequent alignment, as in the prior art.

Furthermore, according to the inventive embodiment, this saves a considerable amount of time during bar assembly, in comparison to conventional assembly methods.

The invention claimed is:

1. An arrangement having a plurality of generator bars for a stator of an electrical generator, comprising:
   a strip wound around and completely surrounding ends of the generator stator bars that mutually braces the respective stator bar ends; and
   a clamping element arranged between the mutually braced bar ends for bracing the bar ends in the strip, where the generator stator bars are electrically connected together via the respective bar ends, wherein the bar ends each have a generally cylindrical cross-sectional shape with mutually facing flattened contact surfaces that each makes contact with a flat surface of the clamping element.

2. The arrangement as claimed in claim 1, wherein the clamping element is wedge-shaped and the arrangement has a clamping screw where the clamping element is movable with respect to the bar ends to brace the bar ends in the strip.

3. The arrangement as claimed in claim 2, wherein the clamping element is electrically conductive.

4. A stator end winding for an electrical generator, comprising:
   a plurality of stator bars that project out of a laminated core;
   a strip wound around and completely surrounding ends of the generator stator bars that mutually braces the respective stator bar ends; and
   a clamping element arranged between the mutually braced bar ends for bracing the bar ends in the strip, where the generator stator bars are electrically connected together via the respective bar ends, wherein the bar ends each have a generally cylindrical cross-sectional shape with mutually facing flattened contact surfaces that each makes contact with a flat surface of the clamping element.

5. The stator end winding as claimed in claim 4, wherein the clamping element is wedge-shaped and the arrangement has a clamping screw where the clamping element is movable with respect to the bar ends to brace the bar ends in the strip.

6. The stator end winding as claimed in claim 5, wherein the clamping element is electrically conductive.

7. An electrical generator having a stator end winding, comprising:
   a laminated stator core;
   a plurality of stator bars that arranged in and projecting out from the laminated stator core;
   a strip wound around and completely surrounding ends of the generator stator bars that mutually braces the respective stator bar ends; and
   a clamping element arranged between the mutually braced bar ends for bracing the bar ends in the strip, where the generator stator bars are electrically connected together via the respective bar ends wherein the bar ends each have a generally cylindrical cross-sectional shale with mutually facing flattened contact surfaces that each makes contact with a flat surface of the clamping element.

8. The electrical generator as claimed in claim 7, wherein the clamping element is wedge-shaped and the arrangement has a clamping screw where the clamping element is movable with respect to the bar ends to brace the bar ends in the strip.

9. The electrical generator as claimed in claim 8, wherein the clamping element is electrically conductive.

\* \* \* \* \*